UNITED STATES PATENT OFFICE.

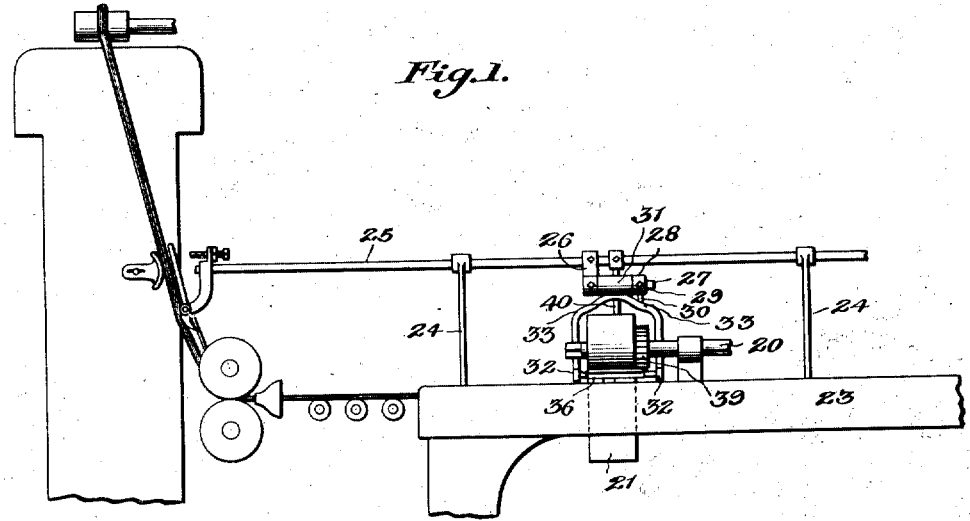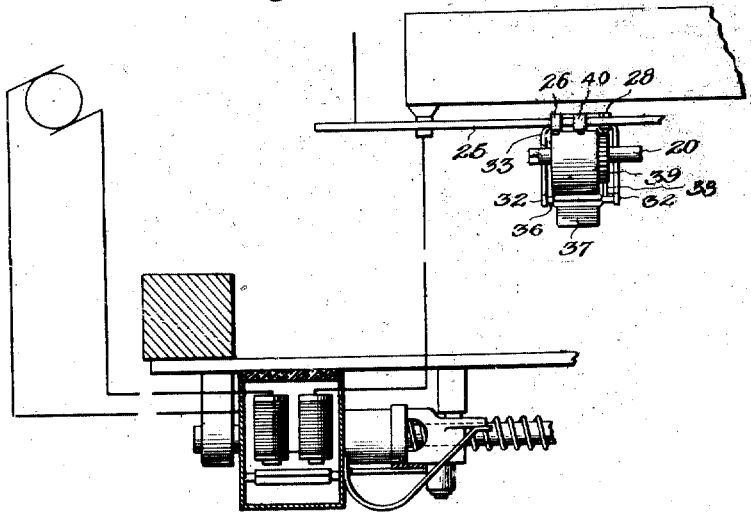

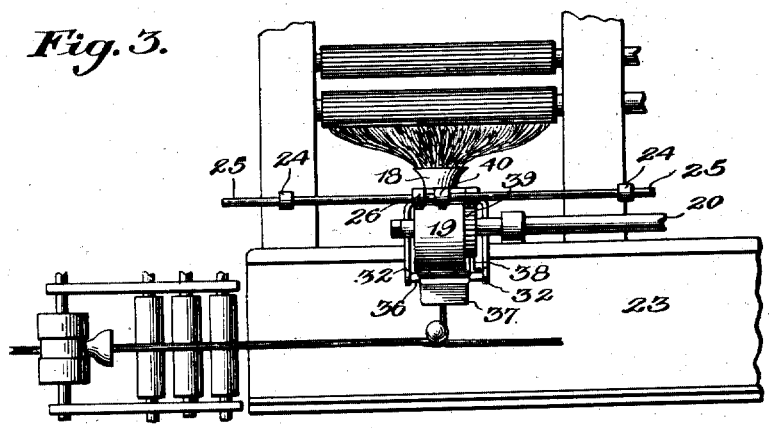
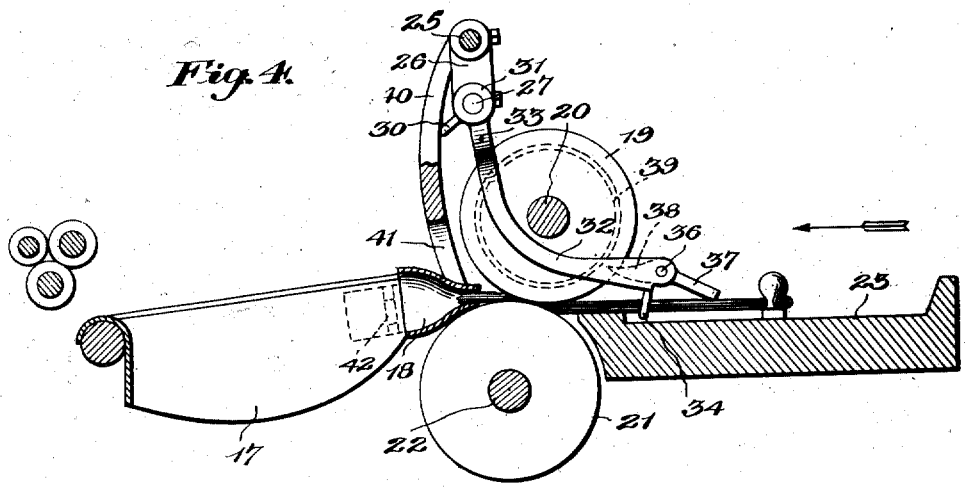
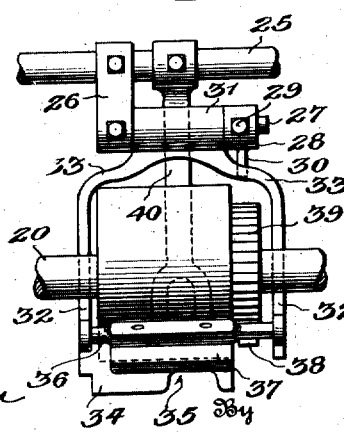

PETER J. DOCKRAY, DECEASED, LATE OF WOONSOCKET, RHODE ISLAND, BY MARY J. DOCKRAY, ADMINISTRATRIX, OF WOONSOCKET, RHODE ISLAND.

STOP-MOTION FOR COMBERS AND THE LIKE.

1,252,096.          Specification of Letters Patent.          Patented Jan. 1, 1918.

Original application filed September 5, 1914, Serial No. 860,401. Divided and this application filed October 23, 1916. Serial No. 127,295.

*To all whom it may concern:*

Be it known that PETER J. DOCKRAY, deceased, late a citizen of the United States, residing at Woonsocket, in the county of Providence and State of Rhode Island, invented certain new and useful Improvements in Stop-Motions for Combers and the like, of which the following is a specification, reference being had therein to the accompanying drawing.

This invention provides a stop-motion for use in association with combers and other fiber-treating machines, and it is an object of the invention to provide efficient and reliably-acting means, the functioning of which is dependent upon occurrence of certain conditions in the material passing through the machine, for stopping the machine.

More particularly, the invention relates to the mechanism that includes a member that moves in response to choking of material between it and delivery-rolls to close an electric circuit that initiates operations of mechanism that acts to stop the machine with which the invention is associated as shown by the application of said PETER J. DOCKRAY, for stop-motion for combers and the like, filed September 5, 1915, Ser. No. 860,401, of which the present application is a division.

While it is not the intention to limit the adaptation of the invention to any particular machine for treating material while in substantially continuous movement, the invention, for purposes of explanation, is described herein as associated with a cotton-comber.

When read in connection with the description herein, the details of construction and arrangement of parts contemplated by the invention will be apparent from the accompanying drawings, forming part hereof, wherein an embodiment of the invention is disclosed, for purposes of illustration.

While the disclosures herein now are considered to exemplify a preferable embodiment of the invention, it is not the intention to be limited necessarily thereto in interpretation of the claims, as alterations within the limits of the claims can be made without departing from the nature and spirit of the invention.

Like reference-characters refer to corresponding parts in the views of the drawings, of which—

Figure 1 is a view in elevation of a portion of a comber;

Fig. 2 is a diagrammatic view illustrative of the wiring;

Fig. 3 is a plan view of some of the parts shown by Fig. 1;

Fig. 4 is a sectional view through the sliver-pan, trumpet, and sliver-table; and Fig. 5 is an enlarged view of parts as seen when looking in the direction of the arrow, Fig. 4.

Referring more particularly to the drawings, in which parts of a comber as hereinbefore mentioned are disclosed, 17 designates a sliver-pan into which sliver is delivered from the combing mechanism of the machine and whence it is drawn as a round strand through a trumpet 18 by an upper calender-roll 19 on a shaft 20 and a lower calender-roll 21 on a shaft 22 and delivered onto a sliver-table 23, one set of such parts being shown as exemplary of others in the machine.

Extending along the sliver-table and supported on and insulated from the machine-frame are a series of standards 24, which carry at their upper ends a rod 25 extending longitudinally of the table above the sets of calender-rolls. Fast on the rod above each set of calender-rolls is a hanger or depending support 26, from the lower portion of which laterally extends a counter-rod 27 having disposition substantially parallel to the rod 25. An abutment 28 is held adjustably on the counter-rod near its free end by a set-screw 29, and depending from the abutment is a stop 30. The abutment holds on the counter-rod a boxing 31, which is a part of a swing-frame that comprises side arms 32, which flare outwardly from the boxing, as shown at 33, and then continue in parallel relation to each other to their free ends. One of the flaring portions 33 of the frame is capable of contact with the stop 30, whereby downward movement of the free ends of the arms is limited and contact of any part of the swing-frame with the sliver-table is prevented. The side arms are a sufficient distance apart to enable them to straddle or to be disposed one slightly beyond each end of the top calender-roll, and they are so curved that they extend from behind and under the shaft of that roll with their free ends above the sliver-table beyond the place of emergence of sliver from between the two rolls. One of the side arms near its free end has secured thereto or formed integrally therewith a depending plate 34, which extends partially across the space between the two arms and fully across the path of movement of the sliver from between the rolls. The plate is cut away from its lower edge, whereby there is formed an opening or passageway 35 for movement therethrough under normal conditions of sliver from the rolls to the table. A rockshaft or its equivalent 36 is mounted pivotally near the ends of the arms and outside of and adjacent to the plate 34, and from this shaft extends a sliver-contact plate or member 37 of non-conductive material arranged to trail on the moving sliver. A pawl 38 also extends from the rock-shaft in such direction that it is capable of engagement with a ratchet-wheel 39 loose on the shaft 20 of the upper calender-roll and adjacent to an end of that roll. The relative disposition of the parts is such that, when the plate 37 has sliver thereunder, the pawl is kept out of engagement with the ratchet-wheel, and that, on running out of the sliver and a consequent assumption of a lower position by the plate, the pawl will engage the ratchet-wheel, close an electric circuit, and stop the machine in a manner hereinafter described. Moreover, when the sliver breaks beyond the calender-rolls, or when it stops being drawn for any reason beyond the delivery side of the rolls while the machine is in operation, sliver will accumulate between the rolls and the plate 34 and by pushing against the plate as it is delivered from the rolls it will operate to raise the swing-arms to contact with the upper calender-roll shaft 20 and thereby close the electric circuit; or such lifting of the free end of the swing-frame may be such as to permit the plate 37 to swing sufficiently to bring the pawl 38 into engagement with the ratchet-wheel 39 and close the circuit. It is immaterial whether the circuit is closed by either or both of these methods.

The circuit-closer herein described is adapted for use with any suitable mechanism, whose action is controlled or initiated by an electric circuit, arranged to stop the machine of which the circuit-closer is a part when the latter acts on occurrence of certain conditions in the material being treated as hereinbefore described.

As an example of the manner in which the circuit-closer may be employed, it is disclosed by Fig. 2 in association with an electric circuit shown diagrammatically in connection with a fragmentary view of a power-shifting mechanism of the kind shown more particularly by the hereinbefore-mentioned prior application Ser. No. 860,401. In this arrangement, one wire of the circuit is connected to the insulated rod 25, in electrical connection with which rod are the sliver-controlled circuit-closers, that is to say the arms 32 of the swing-frame and the pawl 38 of the contact member 37, and the other wire of the circuit is grounded in the machine. When either or both of the circuit-closers mentioned operates as heretofore described, the calender-roll shafts being electrically associated with the machine, the circuit is closed through the insulated rod 25, and the action of the power-shifting mechanism thereby is instituted.

Having thus described the invention, what is claimed as new, and desired to be secured by Letters Patent, is—

1. In a machine in which material treated continuously moves, a stop-motion comprising the combination, with a roll effecting movement of the material and a shaft upon which the roll is mounted, of a pivotally-mounted arm, a member thereon at the side of the roll from which material is delivered and adjacent to the path of movement of the material and arranged to be moved by choking of material between it and the roll, an electric circuit having said arm as one of its poles and having another pole positioned to be contacted by said arm on its movement under choking influence, and a power-shifting device controlled by said circuit.

2. In a machine in which material treated continuously moves, a stop-motion comprising the combination, with a roll effecting movement of the material and a shaft upon which the roll is mounted, of a pivotally-mounted arm, a plate thereon at the side of the roll from which the material is delivered and adjacent to the path of movement of the material and arranged to be moved by choking of material between it and the roll, whereby said arm contacts with said roll-shaft, an electric circuit having said arm as one of its poles, and the roll-shaft as its other pole, and a power-shifting device controlled by said circuit.

3. In a machine in which material treated continuously moves, a stop-motion comprising the combination, with a roll effecting movement of the material, of a swingable arm, a member on said arm adjacent to the path of movement of the material at the side of the roll from which the material is delivered and arranged to swing said arm on contact of choked material thereagainst, a member pivotally mounted on said arm and arranged to trail on the material, a contact member having its movement controlled by said pivotally-mounted member, an electric circuit having said swingable arm as one of its poles and having another pole positioned to be contacted by said arm and by said contact member, and a power-shifting device controlled by said circuit.

4. In a machine in which material treated continuously moves, a stop-motion comprising the combination, with a roll effecting movement of the material and a shaft upon which the roll is mounted, of a swingable arm, a member on said arm adjacent to the path of movement of the material at the side of the roll from which the material is delivered and arranged to swing said arm to contact with said roll-shaft on contact of choked material thereagainst, a member pivotally mounted on said arm and arranged to trail on the material, a contact member having its movement controlled by said pivotally-mounted member, a contact member loose on said roll-shaft and arranged to be contacted by said contact member of said pivotally-mounted member on movement thereof, an electric circuit having said swingable arm as one of its poles and said roll-shaft as its other pole, and a power-shifting device controlled by said circuit.

5. In a circuit-closer for a stop-motion of the class described comprising a swing-frame including arms arranged to straddle the ends of a roll effecting movement of material, a depending plate fixed to one of said arms and arranged to extend over the path of material moving from the roll, a rock-shaft carried by said arms, a plate on said shaft arranged to trail on material passing under said fixed plate, and a contact arm having its movement controlled by said trailing plate.

6. In a circuit-closer for a stop-motion of the class described comprising a supporting-rod, a boxing on said rod, arms extending from said boxing and arranged to straddle the ends of a roll effecting movement of material, a depending plate fixed to one of said arms and arranged to extend over the path of material moving from the roll, and a fixed stop carried by said rod and arranged to limit the downward movement of said plate.

In witness whereof, I affix my signature.

MARY J. DOCKRAY,
*Administratrix of the estate of said Peter J. Dockray, deceased.*

Copies of this patent may be obtained for five cents each, by addressing the "Commissioner of Patents, Washington, D. C."